United States Patent
Mirzaei et al.

(10) Patent No.: US 9,071,317 B2
(45) Date of Patent: Jun. 30, 2015

(54) NULLIFICATION OF TRANSMITTER NOISE AT RECEIVE SIGNAL FREQUENCY

(75) Inventors: Ahmad Mirzaei, Los Angeles, CA (US); Hooman Darabi, Irvine, CA (US)

(73) Assignee: BROADCOM CORPORTION, Irvine, CA (US)

( * ) Notice: Subject to any disclaimer, the term of this patent is extended or adjusted under 35 U.S.C. 154(b) by 874 days.

(21) Appl. No.: 11/825,415

(22) Filed: Jul. 6, 2007

(65) Prior Publication Data
US 2009/0010317 A1    Jan. 8, 2009

(51) Int. Cl.
*H04L 27/00* (2006.01)
*H04B 1/10* (2006.01)

(52) U.S. Cl.
CPC .................................... *H04B 1/1036* (2013.01)

(58) Field of Classification Search
CPC ..................................................... H04B 1/1036
USPC ................................................. 375/259, 296
See application file for complete search history.

(56) References Cited

U.S. PATENT DOCUMENTS

| | | | | |
|---|---|---|---|---|
| 6,020,787 A * | 2/2000 | Kim et al. | ...................... | 330/279 |
| 2002/0191710 A1* | 12/2002 | Jeckeln et al. | ................ | 375/296 |
| 2004/0234011 A1* | 11/2004 | Lindoff et al. | ................ | 375/346 |
| 2005/0123066 A1* | 6/2005 | Sarca | ............................ | 375/296 |
| 2006/0030287 A1* | 2/2006 | Vanderhelm et al. | ......... | 455/296 |
| 2007/0047681 A1* | 3/2007 | Chan et al. | ..................... | 375/350 |
| 2008/0039024 A1* | 2/2008 | Ikeda et al. | ..................... | 455/73 |

* cited by examiner

*Primary Examiner* — Tanmay Shah
(74) *Attorney, Agent, or Firm* — Oblon, McClelland, Maier & Neustadt, L.L.P.

(57) ABSTRACT

According to one exemplary embodiment, a transceiver for nullification of a noise component in a transmitter comprises a noise nullification module loading a selected node in the transmitter. The noise nullification module comprises a mixer that receives inputs from the selected node and a local oscillator, where the mixer is also coupled to a filter such that the noise nullification module presents a low impedance at an approximate frequency of a noise component so as to nullify the noise component. In one embodiment, the noise nullification module results in band-pass filtering of an approximate receive signal frequency so as to nullify a noise component at the receive frequency. In another embodiment, the noise nullification module results in notch filtering of an approximate transmit signal frequency so as to nullify a noise component at a receive signal frequency.

20 Claims, 6 Drawing Sheets

NULLIFICATION OF TRANSMITTER NOISE AT RECEIVE SIGNAL FREQUENCY

BACKGROUND OF THE INVENTION

1. Field of the Invention

The present invention is generally in the field of electronic circuits and systems. More specifically, the present invention is in the field of communications circuits and systems.

2. Background Art

Transceivers are typically used in communications systems to support transmission and reception of communications signals through a common antenna, at radio frequency (RF) in a cellular telephone or other mobile device, for example. Often, in those devices, transmission and reception occur concurrently, at frequencies separated, for instance, by 190 MHz, 80 MHz, or as little as 45 MHz. During transmit, transmission noise may be generated across a range of frequencies, including that frequency range used by the transceiver for receive signals. In addition, during remote operation, as a mobile device is moved farther from a base-station, the strength of its transmit signal must typically increase to compensate for distance, while the strength of a receive signal correspondingly declines. Under those conditions, transmission noise, if not suppressed, may significantly interfere with reception quality.

A conventional approach to providing noise suppression in a transceiver utilizes a duplexer to isolate the transmitter from the receiver. Typically, however, while providing as much as, for example, 45 dB of attenuation, duplexers commonly in use do not completely isolate a transceiver receiver from that transceiver's transmitter. As a result, some transmission noise may leak through the duplexer into the receiver, and this is particularly likely to occur as a transceiver's location grows more remote.

One conventional remedy for noise leakage through a duplexer is use of a surface acoustic wave (SAW) filter at the output of the transmitter power amplifier, to prevent transmitter noise from reaching the duplexer. Unfortunately, these high Q filters at radio frequency are costly, and their implementation consumes a significant amount of board space. Another conventional remedy for noise leakage during remote operation requires high power consumption by the transmitter, in order to optimize transmit signal-to-noise ratio and thus minimize the noise produced during remote transmission. This conventional approach has disadvantages of requiring that the mobile transceiver be equipped with a high power transmitter, and the accompanying large power consumption.

Thus, conventional approaches for suppressing transmission noise in a transceiver may require use of a high power transmitter, include implementation of a bulky and expensive SAW filter, or result in deterioration of a desired reception signal due to noise leakage through a duplexer. Consequently, there is a need in the art for a space saving, cost effective, noise suppression solution, capable of nullifying an undesirable noise signal while enabling use of transceivers equipped with low power transmitters.

SUMMARY OF THE INVENTION

Nullification of transmitter noise at receive signal frequency, substantially as shown in and/or described in connection with at least one of the figures, and as set forth more completely in the claims.

DETAILED DESCRIPTION OF THE INVENTION

The present invention is directed to nullification of transmitter noise at receive signal frequency. Although the invention is described with respect to specific embodiments, the principles of the invention, as defined by the claims appended herein, can obviously be applied beyond the specifically described embodiments of the invention described herein. Moreover, in the description of the present invention, certain details have been left out in order to not obscure the inventive aspects of the invention. The details left out are within the knowledge of a person of ordinary skill in the art.

The drawings in the present application and their accompanying detailed description are directed to merely exemplary embodiments of the invention. To maintain brevity, other embodiments of the invention, which use the principles of the present invention are not specifically described in the present application and are not specifically illustrated by the present drawings.

Figure 1:
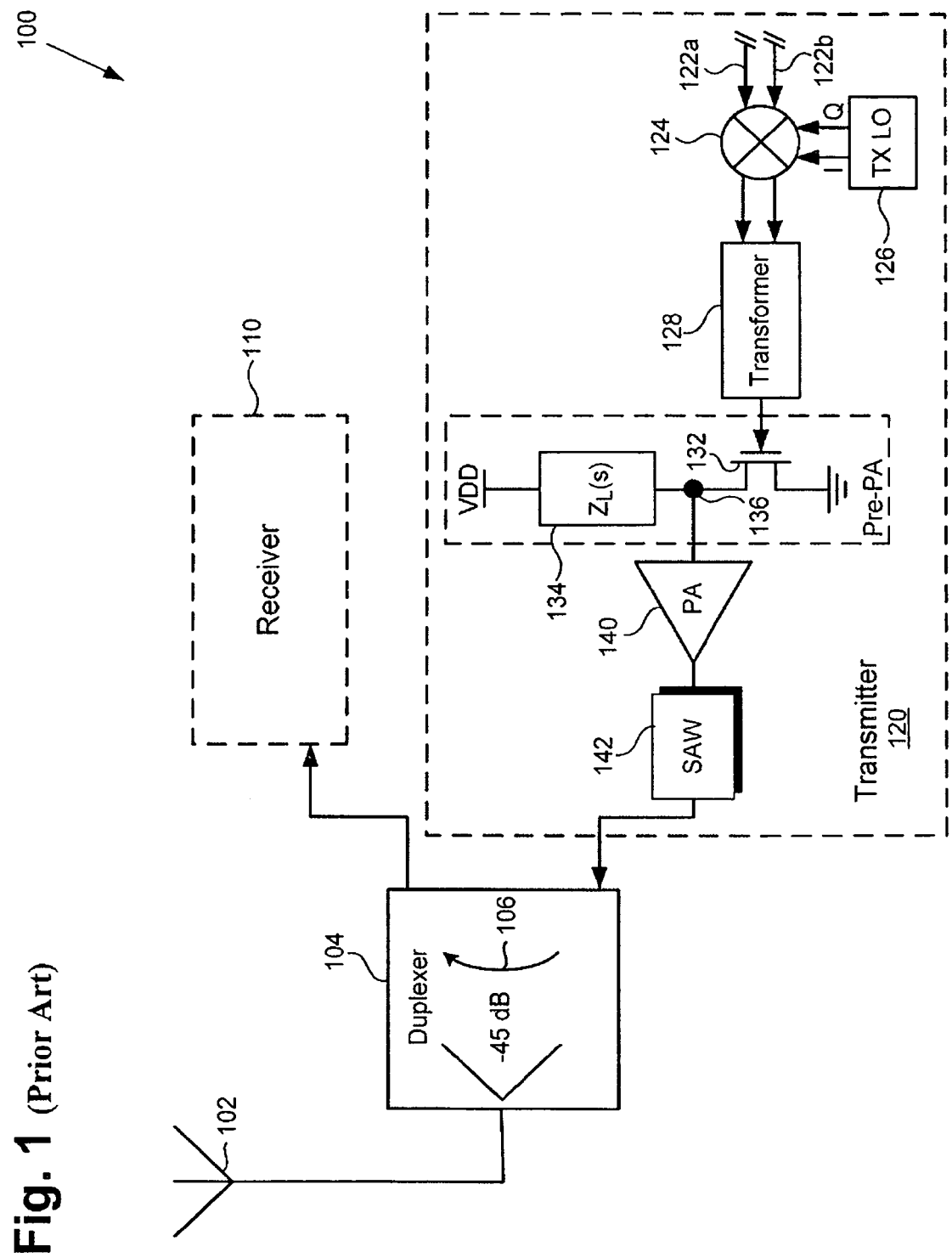
FIG. 1 is a block diagram of a conventional approach to transmission noise suppression in a transceiver.

FIG. 1 is a block diagram of a conventional approach to noise suppression in a transceiver. FIG. 1 shows transceiver 100 comprising antenna 102, duplexer 104, receiver 110 and transmitter 120. In addition, FIG. 1 shows the presence of transmission noise leakage 106 through duplexer 104 into receiver 110. Also shown in FIG. 1 are transmitter components including mixer 124 working in conjunction with in-phase ("I") and quadrature-phase ("Q") signals provided by transmitter local oscillator 126, to up-convert base-band signals provided at inputs 122a and 122b. Transmitter 120 also includes transformer 128, exemplary pre-power amplifier ("exemplary pre-PA") 130, power amplifier ("PA") 140, and surface acoustic wave ("SAW") filter 142. As shown in FIG. 1, exemplary pre-PA 130 is driven by pre-PA field effect transistor ("pre-PA FET") 132 and produces pre-PA output impedance ("$Z_{pre-PA}$") 134 at pre-PA output node 136. Transceiver 100, in FIG. 1, may be utilized in a cellular phone or other mobile device communicating at radio frequency (RF), for example.

In a conventional approach to implementing a transceiver, such as transceiver 100 in FIG. 1, duplexer 104 is typically utilized to isolate receiver 110 from transmitter 120, while coordinating their joint use of antenna 102 to send and receive communications signals. Taking, as an example, a mobile communications device operating at RF, such a device might have a range of frequencies around 1.95 GHz designated for transmit signals, and another range of frequencies 190 MHz higher designated for receive signals, for example. In addition, cellular phones and many other mobile communications devices have transceivers that operate concurrently as receivers and transmitters. As a result, during concurrent operation, noise produced by transmitter 120 at a frequency utilized by receiver 110 for reception may interfere with and degrade the quality of the receive signal if not suppressed.

Duplexer 104, in FIG. 1, is one means relied upon for noise suppression in conventional implementations, and may provide as much as, for instance, −45 dB isolation between transmitter 120 and receiver 110. This finite isolation may be inadequate to entirely prevent transmission noise leakage 106 from passing into receiver 110 under certain operating conditions, however. As an illustrative example, let us consider the case of a cellular telephone at the outermost reaches of its communication range from a base-station. In that situation, the transmission signal sent out from the cellular phone must be as strong as possible, to compensate for the distance from the base-station, while a reception signal will be at its weakest, because of that distance.

Under those remote operating conditions, transmission noise is typically relatively strong, due to the need for a strong transmit signal. Duplexer 104, however, provides only a fixed and finite amount of noise suppression, so that an increase in the strength of transmission noise corresponds to an increased likelihood of transmission noise leakage 106 into receiver 110. When transmission noise leakage does occur during concurrent operation of a receiver and transmitter, and occurs in the range designated for receive frequencies, it is processed like any other receive signal. In other words, it is amplified along with a concurrently arriving desired receive signal, and consequently interferes with the desired signal. Thus, while undesirable under any circumstances, passage of transmission noise leakage 106 into receiver 110 is particularly detrimental to reception quality when it is most likely to happen, that is, during remote operation when transmission noise is strongest and a receive signal at its weakest.

One conventional remedy for noise leakage through duplexer 104 is utilization of SAW filter 142 to block transmission noise at a receive frequency, prior to its arrival at duplexer 104. Because of the relatively narrow range separating transmit and receive frequencies, however, SAW filter 142 must display a sharp transition with substantially no roll-off, to effectively block transmission noise at the receive frequency while permitting the desired transmit signals to pass. As is well known in the art, implementation of such a high Q filter at RF is bulky and expensive, resulting in undesirable consumption of board space and elevated production costs.

Another conventional remedy for transmission noise leakage in lieu of SAW filter 142 requires increasing transmitter power consumption to optimize the signal-to-noise ratio of the transmit signal during remote operation. By burning power to achieve an advantageous signal-to-noise ratio, the amount of transmission noise generated, and the corresponding transmission noise leakage, may be minimized for a given transmit signal strength. However, this conventional solution imposes the disadvantages associated with requiring that mobile transceivers be equipped with high power transmitters.

Figure 2:
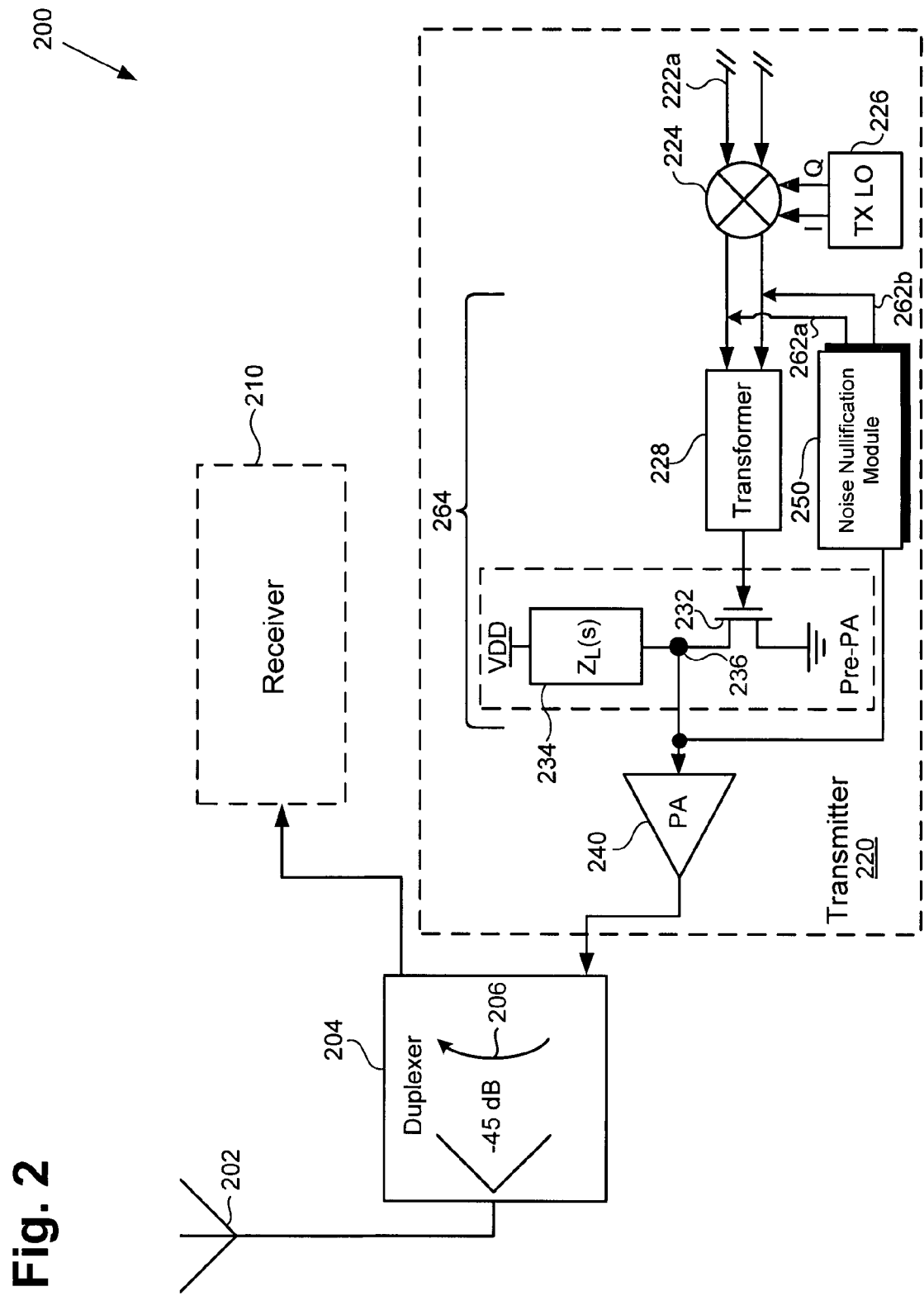
FIG. 2 is a block diagram of a transceiver providing noise nullification, according to one embodiment of the present invention.

FIG. 2 is a block diagram of a transceiver providing noise nullification according to one embodiment of the present invention, capable of overcoming the inadequacies of the conventional approaches described previously in relation to FIG. 1. FIG. 2 shows transceiver 200, comprising antenna 202, duplexer 204, receiver 210 and transmitter 220, corresponding respectively to antenna 102, duplexer 104, receiver 110 and transmitter 120, in FIG. 1. Shown as well, in FIG. 2, is transmission noise leakage 206, passing through duplexer 204 into receiver 210, and corresponding to transmission noise leakage 106 in FIG. 1.

Also present in FIG. 2, are transmitter components including mixer 224 working in conjunction with I and Q signals provided by transmitter local oscillator 226 to up-convert base-band signals provided at inputs 222a and 222b, corresponding respectively to mixer 124, transmitter local oscillator 126, and inputs 122a and 122b, in FIG. 1. Transmitter 220 further includes transformer 228, exemplary pre-PA 230, and PA 240, corresponding to transformer 123, exemplary pre-PA 130, and PA 140, in FIG. 1. As was the case for FIG. 1, in FIG. 2, exemplary pre-PA 230 is driven by pre-PA FET 232 and produces output impedance ("$Z_{pre-PA}$") 234 at pre-PA output node 236, corresponding respectively to exemplary pre-PA 130, pre-PA FET 132 and $Z_{pre-PA}$ 134 at pre-PA output node 136 in the previous figure.

Transceiver 200 in FIG. 2 also comprises noise nullification module 250, having no analogue in the conventional transceiver shown in FIG. 1. As shown in FIG. 2, noise nullification module 250 loads pre-PA output node 236 and provides differential feedback signals 262a and 262b as inputs to transformer 228, thus effectively forming a feedback loop in transmitter 220. As a result of that feedback, transformer 228, exemplary pre-PA 230, and noise nullification module 250 combine to form circuit loop 264, also having no analogue in FIG. 1. It is noted that although in the present embodiment noise nullification module 250 loads pre-PA output node 236, in another embodiment noise nullification module 250 may load another selected node situated in the circuit of transmitter 200. It is further noted that transceiver 200, in FIG. 2, does not include a component corresponding to SAW filter 142 in FIG. 1. Transceiver 200 may be utilized in a cellular phone, wireless computer, or other mobile device, communicating at radio frequency (RF) in a range from approximately 1.8 GHz to approximately 2.2 GHz, for example.

As a specific but non-limiting example of the operation of exemplary transceiver 200, let us assume that transceiver 200 is utilized in a cellular telephone transmitting in a frequency range from approximately 1920 MHz to approximately 1980 MHz, and receiving in a frequency range from approximately 2110 MHz to approximately 2170 MHz. For the specific example of a cellular telephone being used here for illustration, exemplary pre-PA 230 and the additional transmitter components contributing to a transmission signal preceding exemplary pre-PA 230 are likely to be on-chip, while PA 240 and duplexer 204 are likely to be off-chip. As is known in the art, substantially all of the transmission noise produced in a cellular phone transceiver is generated by the on-chip components, so that PA 240 can be thought of as effectively noiseless. Thus, substantially all of the transmission noise produced by transmitter 220 in FIG. 2 is provided at pre-PA output node 236, where it may be amplified by PA 240, and passed on to duplexer 204.

As mentioned previously in connection with FIG. 1, during concurrent operation of transmitter 220 and receiver 210 in FIG. 2, some of the transmission noise produced may be in the frequency range, i.e. approximately 2110 MHz to approximately 2170 MHz, recognized by receiver 210 as a receive signal. Under conditions of remote operation, that is, when the exemplary cellular telephone is far away from a base-station, transmitter 220 may increase its transmit signal strength to compensate for the remote distance, while the strength of a desired receive signal arriving at receiver 210 is correspondingly diminished. Under these circumstances, PA 240 may provide as much as approximately 24 dB of gain to the output signal of exemplary pre-PA 230, for example. In the absence of noise nullification module 250, that gain would be applied to the transmission noise generated at receive frequencies, as well as to the intended transmit signal, so that a highly amplified transmission noise signal may pass into duplexer 204, and some portion of that noise signal may penetrate the finite isolation provided by duplexer 204, and enter receiver 210 as transmission noise leakage 206.

The present embodiment achieves noise nullification by producing a voltage null at pre-PA output node 236 for transmission noise components corresponding to a receive frequency channel, by substantially reducing the effective output impedance ("$Z_{Effective}$") at pre-PA output node 236 for those frequencies. In the present embodiment, the variation in effective output impedance results from the behavior of circuit loop 264. Inspection of FIG. 2 reveals that, unlike the conventional implementation shown in FIG. 1 in which the output impedance at pre-PA output node 136 was determined and largely fixed at $Z_{pre-PA}$, presence of noise nullification module 250 in circuit loop 264 produces an effective output impedance at pre-PA output node 236 given by Equation 1:

$$Z_{Effective} = Z_{pre-PA}/[1+(\text{Loop Gain})] \quad \text{(Equation 1)};$$

where the Loop Gain refers to the cumulative effect of the components making up circuit loop 264 in FIG. 2. The Loop Gain is further defined by Equation 2:

$$\text{Loop Gain} = (G_{NNM} * Z_{Transformer} * G_{FET} * Z_{pre-PA}) \quad \text{(Equation 2)};$$

where $G_{NNM}$ is the admittance of noise nullification module 250, $Z_{Transformer}$ is the impednce presented by transformer 228, $G_{FET}$ is the admittance of pre-PA FET 232, and $Z_{pre-PA}$ is output impedance 234 of exemplary pre-PA 230. Equations 1 and 2 may be readily verified by reference to standard impedance relationships that are well known in the art.

As seen from Equations 1 and 2, $Z_{Effective}$ reduces to $Z_{pre-PA}$ when the Loop Gain is zero. Examination of Equation 2, however, reveals that the Loop Gain is a product of $G_{NNM}$ and three fixed, non-zero constants, $Z_{Transformer}$, $G_{FET}$, and $Z_{pre-PA}$. As a result, in order for $Z_{Effective}$ to reduce to $Z_{pre-PA}$, $G_{NNM}$ must be substantially equal to zero, i.e., noise nullification module 250 presents high impedance. By contrast, when the impedance presented by noise nullification module 250 is low, its correspondingly elevated admittance causes $Z_{Effective}$ to vary from $Z_{pre-PA}$. Thus $Z_{Effective}$ is a variable output impedance, which varies inversely with the admittance of noise nullification module 250. According to the present embodiment, noise nullification module 250 is designed to present a high admittance for noise components in a receive frequency range, and very low admittance for all other signal frequencies. Noise nullification module 250 may provide those frequency dependent admittance values by being configured to implement band-pass filtering, or notch filtering, for example.

Figure 3:
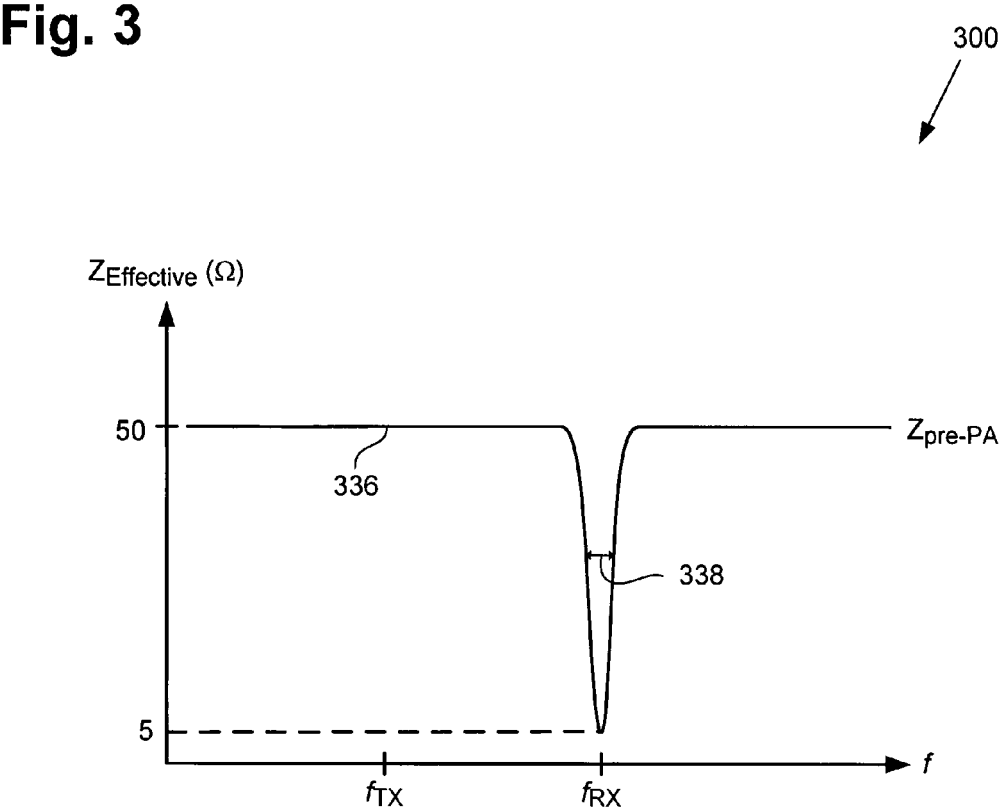
FIG. 3 shows a graph of an exemplary effective output impedance as a function of signal frequency at a selected node loaded by a noise nullification module, according to one embodiment of the present invention.

The effect of including a noise nullification module configured to implement band-pass filtering as noise nullification module 250 in transceiver 200 can be seen in FIG. 3. FIG. 3 shows a graph of $Z_{Effective}$ as a function of signal frequency at pre-PA output node 236 loaded by noise nullification module 250, according to one embodiment of the present invention. Graph 300 in FIG. 3 shows impedance curve 336 across a range of signal frequencies including a transmit frequency ("$f_{TX}$") and a receive frequency ("$f_{RX}$"). As can be seen from graph 300, $Z_{Effective}$ is equal to $Z_{pre-PA}$, for example 50 ohms, for all frequencies except a band of frequencies of bandwidth 338 approximately centered at receive frequency $f_{RX}$. Bandwidth 338 may be, for example, approximately 6 MHz. Consequently, at approximately $f_{RX}$, impedance curve 336 assumes its minimum value, for example 5 ohms. As a result of the low impedance encountered by a noise signal having frequency $f_{RX}$ at pre-PA output node 236 in FIG. 2, inclusion of noise nullification module 250 in transmitter 200 produces a voltage null at pre-PA output node 236 for that noise signal frequency.

Thus, by including noise nullification module 250 in transmitter 220, the present exemplary embodiment substantially reduces a noise signal provided at pre-PA output node 236, thereby effectively nullifying that noise signal and preventing its subsequent amplification at PA 240. In addition, the amplified signal sent to duplexer 204 is substantially free of transmission noise at a receive frequency, so that the limited isolation provided by duplexer 204 is sufficient to prevent transmission noise leakage 206 at a receive frequency. As a result, reception quality may be substantially improved over that available using conventional transceiver implementations relying solely on duplexer 204 for noise suppression. Moreover, unlike conventional approaches to minimizing transmission noise, the present embodiment does not require that transmitter 220 include a bulky and expensive SAW filter, nor that transceiver 200 be equipped with a high power transmitter in order improve its signal to noise ratio when transmitting to a distant base-station.

Figure 4:
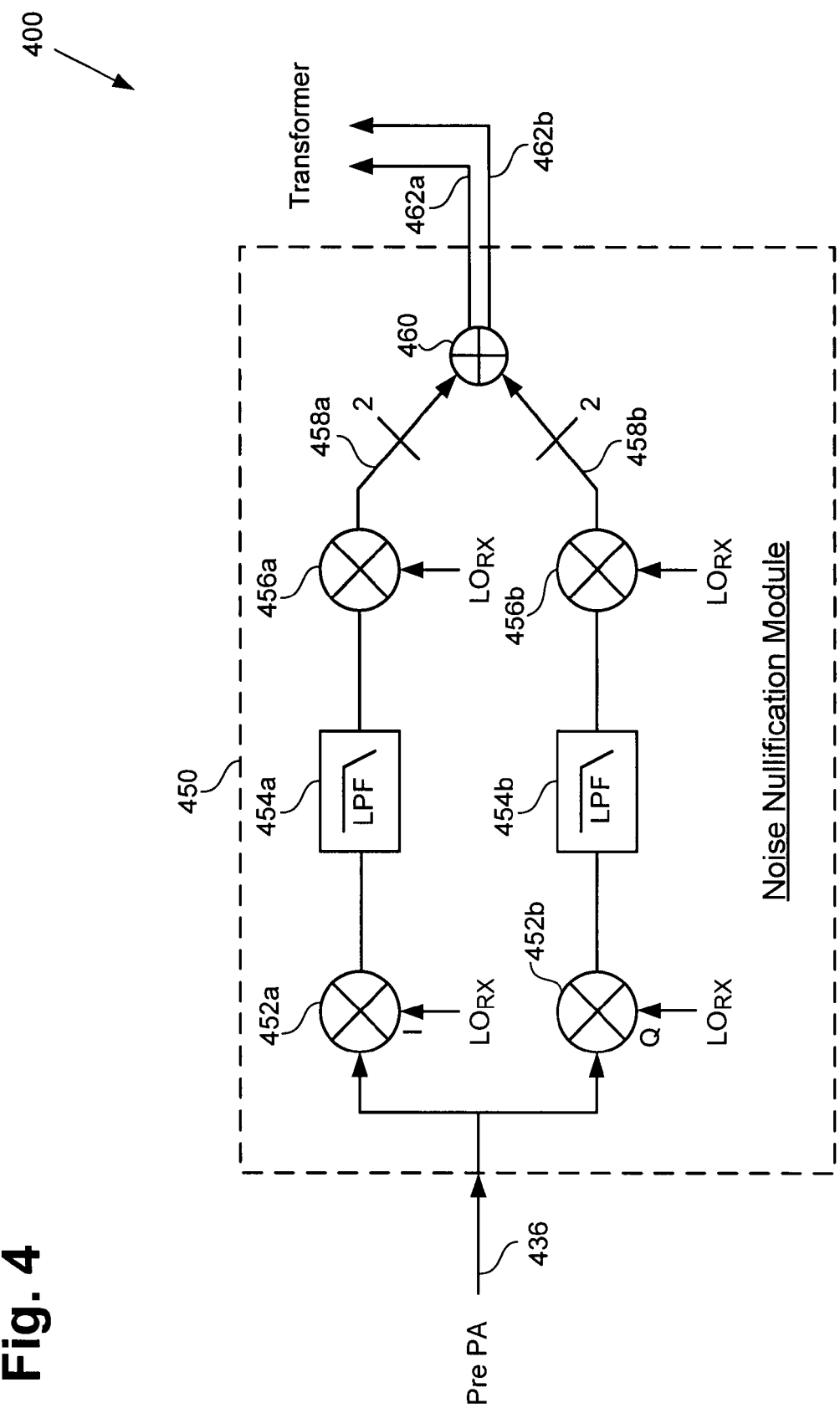
FIG. 4 shows an exemplary noise nullification module, according to one embodiment of the present invention.

FIG. 4 shows an exemplary noise nullification module configured to implement band-pass filtering, according to one embodiment of the present invention. Structure 400 in FIG. 4 shows noise nullification module 450 receiving input 436 from an exemplary pre-PA (not shown in FIG. 3), and providing differential feedback signals 462a and 462b. Structure 400 provides an exemplary representation of noise nullification module 250 loading pre-PA output node 236, and providing differential feedback signals 262a and 262b, in FIG. 2.

Noise nullification module 450 in FIG. 4 comprises mixers 452a and 452b to down-convert input signal 436 in conjunction with I and Q signals provided by a receiver local oscillator (not shown in FIG. 4), low-pass filters 454a and 454b, mixers 456a and 456b to up-convert I and Q components of a filtered transmission noise signal in conjunction with the same receiver local oscillator used for down-conversion (again, not shown in FIG. 4), and device 460, which combines the outputs 458a and 458b of, respectively, mixers 456a and 456b, to provide differential feedback signals 462a and 462b. It is noted that the outputs 458a and 458b are differential outputs, as indicated by the numeral 2 accompanying each output line, but are shown in FIG. 4 as single lines for simplicity and economy of presentation.

Continuing with FIG. 4 and the specific example of a cellular telephone transmitting at approximately 1950 MHz while generating transmission noise at a receive frequency of approximately 2140 MHz, we can see that input 436 to noise nullification module 450 will include a transmit signal at approximately 1950 MHz and a transmission noise signal at approximately 2140 MHz. Input 436 enters noise nullification module 450, where it is down-converted by mixers 452a and 452b and a receiver local oscillator providing I and Q signals at the receive signal frequency of the transceiver's receiver, in this instance approximately 2140 MHz.

Down-conversion at mixers 452a and 452b shifts the undesirable transmission noise components to essentially DC level, while the desired transmit signal is down-converted to approximately 190 MHz. Those signals are then filtered by low-pass filters 454a and 454b, which allow only low frequency signals to pass, for example, blocking all frequencies above 3 MHz. It is noted that while separation of a transmit signal and a transmission noise signal 190 MHz apart may be difficult to achieve at RF, requiring a high Q filter presently unavailable in an integrated implementation, the filtering is relatively easy and inexpensive to accomplish after down-conversion, as occurs in the present embodiment.

Figure 5:
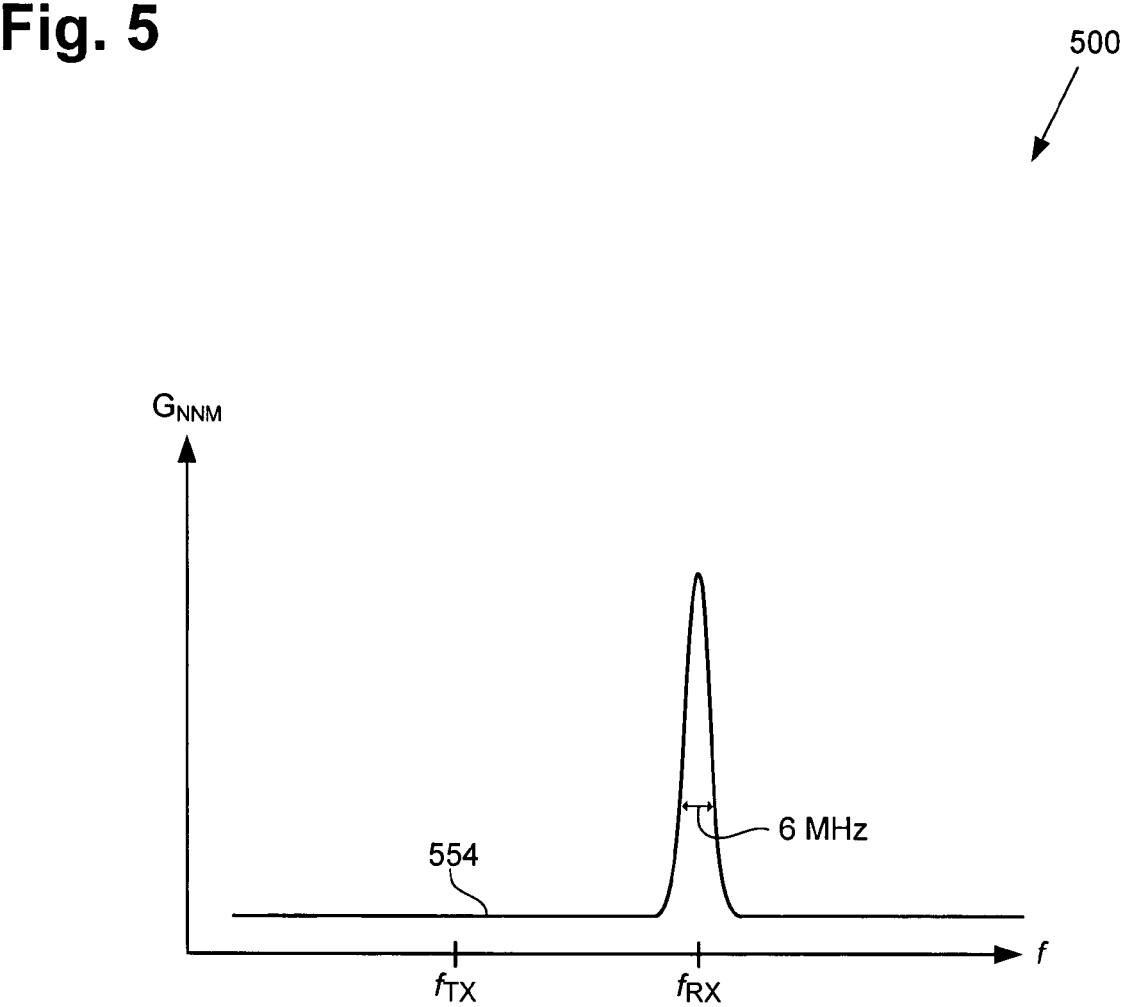
FIG. 5 shows a graph of an exemplary frequency response for a noise nullification module, according to one embodiment of the present invention.

FIG. 5 shows a graph of an exemplary frequency response for a noise nullification module, according to the embodiment of FIG. 4. Graph 500 displays the frequency dependent admittance of noise nullification module 450, as curve 554 in FIG. 5. Looking back to FIG. 4, it can be seen that low-pass filters 454a and 454b determine the bandwidth admitted through noise nullification module 450, while the receiver local oscillator driving mixers 452a and 452b tunes the frequency dependent admittance. For example, when low-pass filters 454a and 454b are configured to pass signals having frequency up to 3 MHz, while blocking higher frequency signals, the admittance through low-pass filters 454a and 454b will be high for the transmission noise signal down-converted to essentially DC by mixers 452a and 452b, but very low for the transmit signal at 190 MHz.

The input signal frequency down-converted to essentially DC, i.e. recognized by the present embodiment's noise nullification module, is determined by the frequency of the signal provided by the receiver local oscillator. Thus, when the receiver is tuned to recognize a receive signal at, for example, 2140 MHz, noise nullification module 450 is automatically tuned to provide a minimum impedance near that frequency. This corresponds to curve 554 in FIG. 5, which shows a local admittance maximum for $G_{NNM}$ at a receive signal frequency and a low admittance at a transmit signal frequency.

Because $G_{NNM}$ effectively determines the frequency dependence of the Loop Gain of circuit loop 264 in FIG. 2, as shown by Equation 2, it also determines the frequency dependence of $Z_{Effective}$, according to Equation 1. As a result, the $Z_{Effective}$ presented by loop circuit 264 at pre-PA output node 236, in FIG. 2, is simply $Z_{pre-PA}$ for all frequencies except a band of approximately 6 MHz centered at $f_{RX}$, for which narrow range $Z_{Effective}$ goes to its minimum value.

The minimum value of $Z_{Effective}$ occurring at approximately $f_{RX}$, produces a voltage null at pre-PA output node 236 for that frequency, thereby nullifying that noise component. Thus, the exemplary embodiment of the present invention's noise nullification module, shown in FIG. 4, results in tuned band-pass filtering of the output of exemplary pre-PA 230 in FIG. 2, and produces the frequency dependent admittance response shown in graph 500 of FIG. 5. That frequency dependent admittance, in turn, determines the frequency dependent effective impedance produced at pre-PA output node 236 in FIG. 2, and shown by graph 300, in FIG. 3.

Figure 6A:
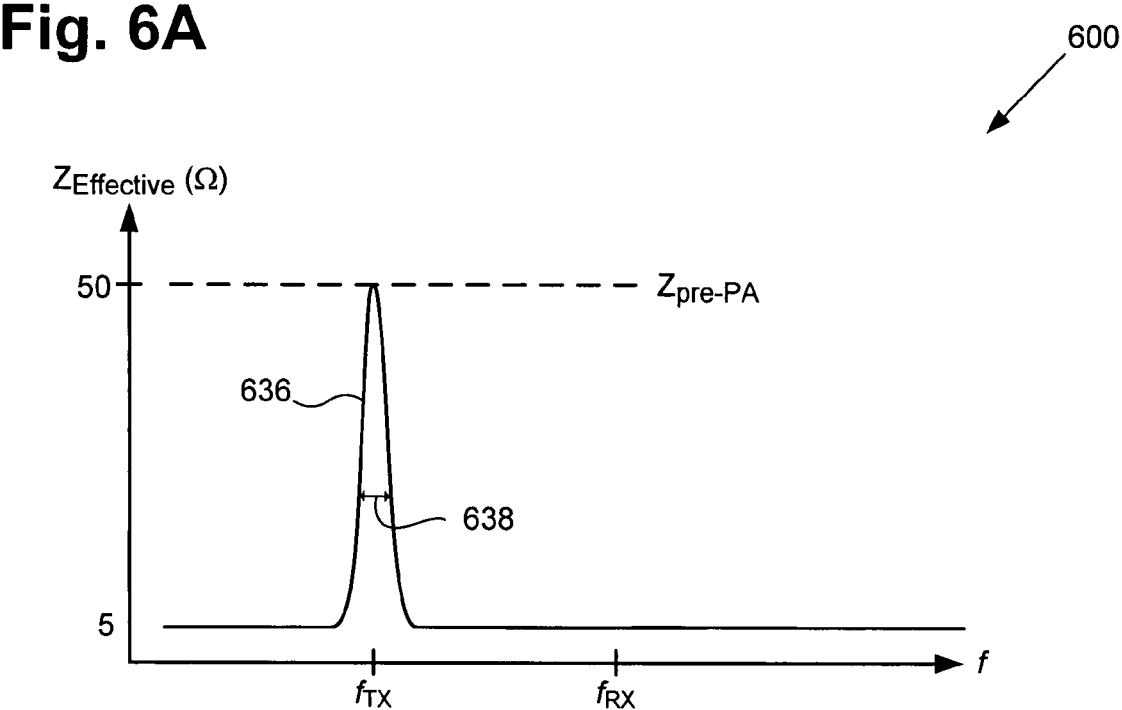
FIG. 6A shows a graph of an exemplary effective output impedance as a function of signal frequency at a selected node loaded by a noise nullification module, according to another embodiment of the present invention.

FIG. 6A shows a graph of exemplary $Z_{Effective}$ as a function of signal frequency at a selected node loaded by a noise nullification module, according to another embodiment of the present invention. FIG. 6A corresponds to noise nullification provided by a noise nullification module configured to implement notch filtering. Graph 600 in FIG. 6A shows impedance curve 636 across a range of signal frequencies including transmit frequency $f_{TX}$ and receive frequency $f_{RX}$. As can be seen from graph 600, $Z_{Effective}$ is low, for example 5 ohms, for all frequencies except a band of frequencies of bandwidth 638 approximately centered at transmit frequency $f_{TX}$. Bandwidth 638 may be, for example, approximately 6 MHz. Consequently, at approximately $f_{TX}$, impedance curve 636 assumes its maximum value, for example 50 ohms. As a result of the comparably high impedance encountered by a transmit signal having frequency $f_{TX}$ at pre-PA output node 236 in FIG. 2, it will present a relatively strong voltage signal that is then passed on to a transmitter PA. By contrast, signals having a frequency outside of bandwidth 638, including a noise signal at $f_{RX}$, will present voltage nulls, causing those signals to be nullified.

Figure 6B:
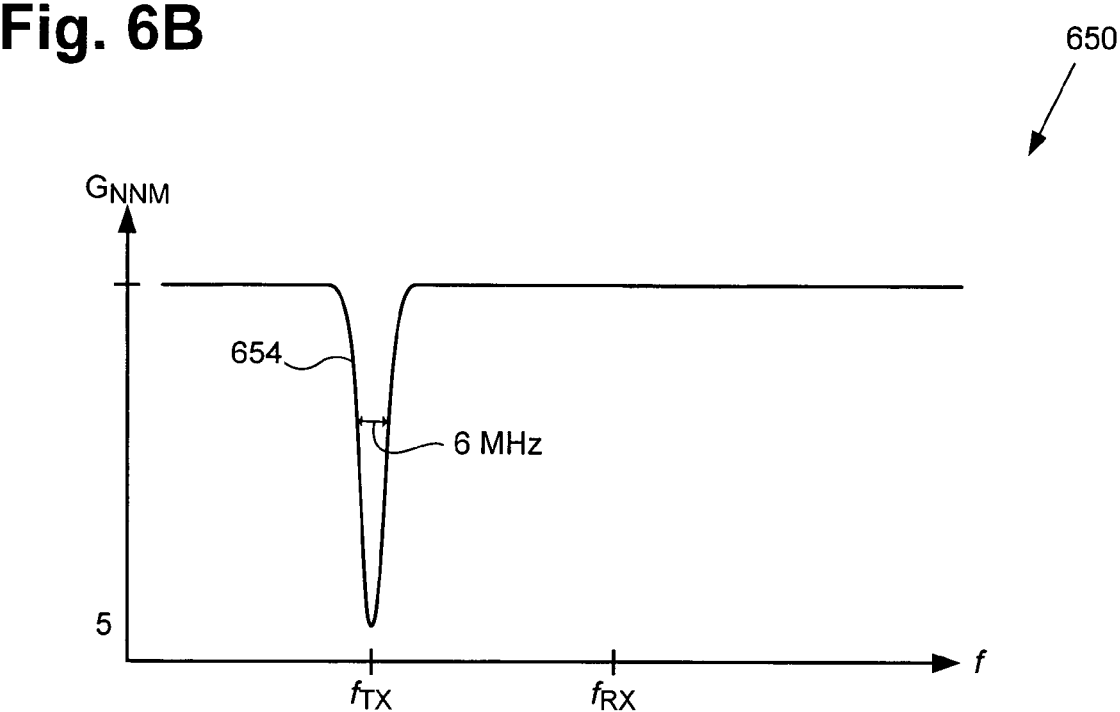
FIG. 6B shows a graph of an exemplary frequency response for a noise nullification module, according to the embodiment corresponding to FIG. 6A.

FIG. 6B shows a graph of an exemplary frequency response for a noise nullification module, corresponding to the effective impedance graph shown in FIG. 6A. Graph 650 displays the frequency dependent admittance of the noise nullification module represented in FIG. 6A, as curve 654 in FIG. 6B. Designed to function as a notch filter, the present embodiment's noise nullification module is configured to block signals in a frequency bandwidth, for example 6 MHz, approximately centered at $f_{TX}$, while passing transmission signals at $f_{RX}$ and other frequencies. This corresponds to curve 654 in FIG. 6B, which shows a local minimum for admittance $G_{NNM}$ at a transmit signal frequency and a relatively high admittance at a receive signal frequency. One notable advantage of a noise nullification module configured to provide notch filtering at a transmit frequency is that the filtering function may be implemented utilizing a transmitter local oscillator for down conversion of an input signal, rather than the receiver local oscillator, as required by the band-pass filtering implementation shown in FIG. 4.

In its various embodiments, the present invention's transceiver and module providing noise nullification can be utilized in an electronic system in, for example, a wired or wireless communications device, a cellular telephone, a Bluetooth enabled device, a computer, a satellite set-top box, an RF transceiver, a personal digital assistant (PDA), or in any other kind of system, device, component or module utilized as a transceiver in modern electronics applications. By providing a frequency dependent noise nullification module that presents a high admittance for a receive signal frequency and a high impedance for a transmit signal frequency, the present invention provides effective suppression of undesirable transmission noise, independent of transmitter power.

As a result, the present invention preserves reception quality even during remote operation of a mobile communication device, when reception signals may be weak and transmission noise particularly strong. Thus, embodiments of the present invention's transceiver and system providing noise cancellation result in a significant improvement in reception quality at all reception distances, while advantageously allowing for transceiver implementations using low power transmitters. Moreover, unlike many conventional solutions, the present invention achieves effective noise suppression without requiring a transmitter equipped with a bulky and costly SAW filter.

From the above description of the invention it is manifest that various techniques can be used for implementing the concepts of the present invention without departing from its scope. Moreover, while the invention has been described with specific reference to certain embodiments, a person of ordinary skill in the art would recognize that changes can be made in form and detail without departing from the spirit and the scope of the invention. The described embodiments are to be considered in all respects as illustrative and not restrictive. It should also be understood that the invention is not limited to the particular embodiments described herein, but is capable of many rearrangements, modifications, and substitutions without departing from the scope of the invention.

Thus, nullification of transmitter noise at receive signal frequency has been described.

The invention claimed is:

1. A transceiver for nullification of a noise component in a transmitter, said transceiver comprising:
circuitry configured to vary output impedance at a node of said transmitter so as to nullify said noise component at said node, said node receiving a transmit signal prior to said transmit signal being amplified for transmission; and a pre-power amplifier and a transformer configured to form a feedback loop with said circuitry, wherein said circuitry includes mixers configured to receive inputs from said node and a receiver local oscillator and to generate differential signals based on the received inputs from said node and said receiver local oscillator, and the transformer is configured to receive the differential signals, to generate a signal based on the received differential signals, and to output said signal to said pre-power amplifier to vary said output impedance at said node.

2. The transceiver of claim 1, wherein said node is an output node of said pre-power amplifier.

3. The transceiver of claim 1, wherein said circuitry is configured to provide said differential signals as inputs to said transformer and said transformer is configured to provide an input to said pre-power amplifier.

4. The transceiver of claim 1, wherein said circuitry includes a first mixer and a second mixer, said first mixer is coupled to a filter and is configured to receive inputs from said node and a receiver local oscillator, and said second mixer is configured to receive inputs from said filter and said receiver local oscillator.

5. The transceiver of claim 1, wherein said circuitry is configured to provide low impedance at said node at a frequency of said noise component so as to nullify said noise component at said node.

6. The transceiver of claim 1, wherein a frequency of said noise component is equal to a receive signal frequency.

7. The transceiver of claim 1, wherein said circuitry is configured to provide high impedance at a transmit signal frequency.

8. The transceiver of claim 1, wherein said circuitry is configured to implement one of a band-pass filter and a notch filter.

9. The transceiver of claim 4, wherein said filter includes a low pass filter.

10. A noise nullification module for nullification of a noise component in a transmitter, said noise nullification module comprising:

circuitry configured to vary output impedance at a node of said transmitter so as to nullify said noise component at said node, said node receiving a transmit signal prior to said transmit signal being amplified for transmission; and a pre-power amplifier and a transformer configured to form a feedback loop with said circuitry, wherein said circuitry includes mixers configured to receive inputs from said node and a receiver local oscillator and to generate differential signals based on the received inputs from said node and said receiver local oscillator, and the transformer is configured to receive the differential signals, to generate a signal based on the received differential signals, and to output said signal to said pre-power amplifier to vary said output impedance at said node.

11. The noise nullification module of claim 10, wherein said node is an output node of said pre-power amplifier.

12. The noise nullification module of claim 10, wherein said circuitry is configured to provide said differential signals as inputs to said transformer and said transformer is configured to provide an input to said pre-power amplifier.

13. The noise nullification module of claim 10, wherein said circuitry includes a first mixer and a second mixer, said first mixer is coupled to a filter and is configured to receive inputs from said node and a receiver local oscillator, and said second mixer is configured to receive inputs from said filter and said receiver local oscillator.

14. The noise nullification module of claim 10, wherein said circuitry is configured to provide low impedance at said node at a frequency of said noise component so as to nullify said noise component at said node.

15. The noise nullification module of claim 10, wherein a frequency of said noise component is equal to a receive signal frequency.

16. The noise nullification module of claim 10, wherein said circuitry is configured to provide high impedance at a transmit signal frequency.

17. The noise nullification module of claim 10, wherein said circuitry is configured to implement one of a band-pass filter and a notch filter.

18. The noise nullification module of claim 13, wherein said filter includes a low pass filter.

19. The transceiver of claim 1, further comprising another mixer configured to receive baseband signals and inputs from a transmitter local oscillator, and to output signals to said transformer based on said received baseband signals and said received inputs from said transmitter local oscillator.

20. The noise nullification module of claim 10, further comprising another mixer configured to receive baseband signals and inputs from a transmitter local oscillator, and to output signals to said transformer based on said received baseband signals and said received inputs from said transmitter local oscillator.

* * * * *